United States Patent
Thakker

(10) Patent No.: US 6,907,242 B2
(45) Date of Patent: Jun. 14, 2005

(54) LOCAL SUBSCRIBER NUMBER AND SERVICES FOR NON-LOCAL WIRELESS SUBSCRIBERS

(75) Inventor: Kaushal Thakker, Irving, TX (US)

(73) Assignee: Ericsson Inc., Plano, TX (US)

( * ) Notice: Subject to any disclaimer, the term of this patent is extended or adjusted under 35 U.S.C. 154(b) by 357 days.

(21) Appl. No.: 09/969,253

(22) Filed: Oct. 2, 2001

(65) Prior Publication Data

US 2003/0064723 A1 Apr. 3, 2003

(51) Int. Cl.⁷ .................................................. H04Q 7/20
(52) U.S. Cl. ........................ 455/432.1; 455/432.2; 455/432.3; 455/435.1
(58) Field of Search ............................ 455/432, 435, 455/445, 552, 556

(56) References Cited

U.S. PATENT DOCUMENTS

| | | | | |
|---|---|---|---|---|
| 4,833,701 A | * | 5/1989 | Comroe et al. | 455/509 |
| 5,479,478 A | * | 12/1995 | Fath | 455/459 |
| 5,832,382 A | * | 11/1998 | Alperovich | 455/433 |
| 5,878,347 A | * | 3/1999 | Joensuu et al. | 455/433 |
| 5,884,179 A | * | 3/1999 | Patel | 455/445 |
| 5,991,621 A | * | 11/1999 | Alperovich | 455/433 |
| 6,064,887 A | * | 5/2000 | Kallioniemi et al. | 455/445 |
| 6,122,510 A | * | 9/2000 | Granberg | 455/433 |
| 6,633,755 B1 | * | 10/2003 | Haumont | 455/406 |
| 6,658,253 B1 | * | 12/2003 | Berggren et al. | 455/444 |

FOREIGN PATENT DOCUMENTS

WO    WO 98/11754    *   3/1998      H04Q/7/38

* cited by examiner

Primary Examiner—William Trost
Assistant Examiner—James D Ewart

(57) ABSTRACT

A system and method for providing local service to non-local subscribers in a telecommunications network. The systems and methods employ mapping of a subscriber IMSI with a unique local identifier for use by the local system for locally originating and terminating calls.

15 Claims, 7 Drawing Sheets

LOCAL SUBSCRIBER NUMBER AND SERVICES FOR NON-LOCAL WIRELESS SUBSCRIBERS

TECHNICAL FIELD

The invention relates in general to systems and methods for providing local wireless service to non-local subscribers in a wireless telecommunications network. More particularly, the invention relates to systems and methods for providing services to non-local subscribers for locally originating and terminating calls without alteration of standard mobile terminals, and without alteration of roaming service from the home network.

BACKGROUND OF THE INVENTION

Wireless telecommunications systems exist and overlap throughout the world providing both local, national and international calling services. Although many wireless telecommunications exist, increasingly, dual and multiple band phones permit international roaming for subscribers using the same wireless terminal. For example dual band global system for mobile communications (GSM) "world phones" permit international roaming for GSM subscribers, e.g., between GSM 900 and GSM 1900 public land mobile networks (PLMN). A GSM subscriber with a dual band GSM device can roam between two or more countries and continue to receive service provided the operators in the various countries have a roaming agreement.

A serious disadvantage with international roaming as it exists today is that local callers must dial an international number to reach the GSM subscriber even if the GSM subscriber is geographically located in their local area. This is expensive in terms of both utilization of network resources and costs to the callers and subscribers.

An example of the current state of international roaming is shown in FIG. 1. If a roaming GSM subscriber represented by handset 10 is located in a country 12 not local to his home PLMN 14, a local caller 16 must dial the GSM subscriber's 10 home system telephone number resulting in a connection to the home PLMN 14 as indicated by signal path 18. The Home Location Register (HLR) 20 of the home PLMN 14 routes the call to the roaming subscriber 10 in the distant country 13. The call is connected via the local PLMN 22 and as indicated by signal paths 24 and 26.

It would be desirable to have a visiting wireless subscriber access the local wireless services while roaming in distant lands using improved local calling techniques. Such calling techniques would result in improved customer service, improved operator efficiency, lower costs, and other advantages.

SUMMARY OF THE INVENTION

The invention provides methods and systems for offering local subscriber number and wireless telecommunication services to a non-local subscriber according to prearrangements between a local network operator and a non-local network operator.

The invention provides a method of providing local wireless telecommunication service to a non-local subscriber. According to the invention, a non-local subscriber obtains a local subscriber number from a local operator such that the local operator provides service to the non-local subscriber via the local subscriber number.

According to one aspect of the invention, a unique visitor identifier e.g., a Local MSISDN (LMSISDN), is mapped to the globally unique International Mobile Subscriber Identifier (IMSI) of the non-local subscriber.

According to another aspect of the invention, a registry of the local network associates the non-local subscriber IMSI with a unique visitor identifier, e.g., LMSISDN.

According to yet another aspect of the invention, the method includes steps for dissociating the unique visitor identifier from the non-local subscriber IMSI.

A system of the invention includes means for providing a non-local subscriber with a unique visitor identifier in a local registry and means for providing local wireless services via the unique visitor identifier.

The invention provides numerous technical advantages including increased efficiency for network operators providing services to non-local subscribers, improved service to subscribers, and decreased costs for local callers, subscribers, and network operators.

BRIEF DESCRIPTION OF THE DRAWINGS

The above advantages, as well as specific embodiments of the present invention, will be more clearly understood from consideration of the following descriptions in connection with the accompanying drawings in which.

Corresponding numerals and symbols in the various figures refer to corresponding parts unless otherwise indicated. Some features of embodiments shown and discussed are simplified or exaggerated for illustrating the principles of the invention.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. Examples of the invention are given in the context of GSM, however, it should be understood that the invention may be practiced with wireless devices and networks of various types and in various configurations.

Figure 1:
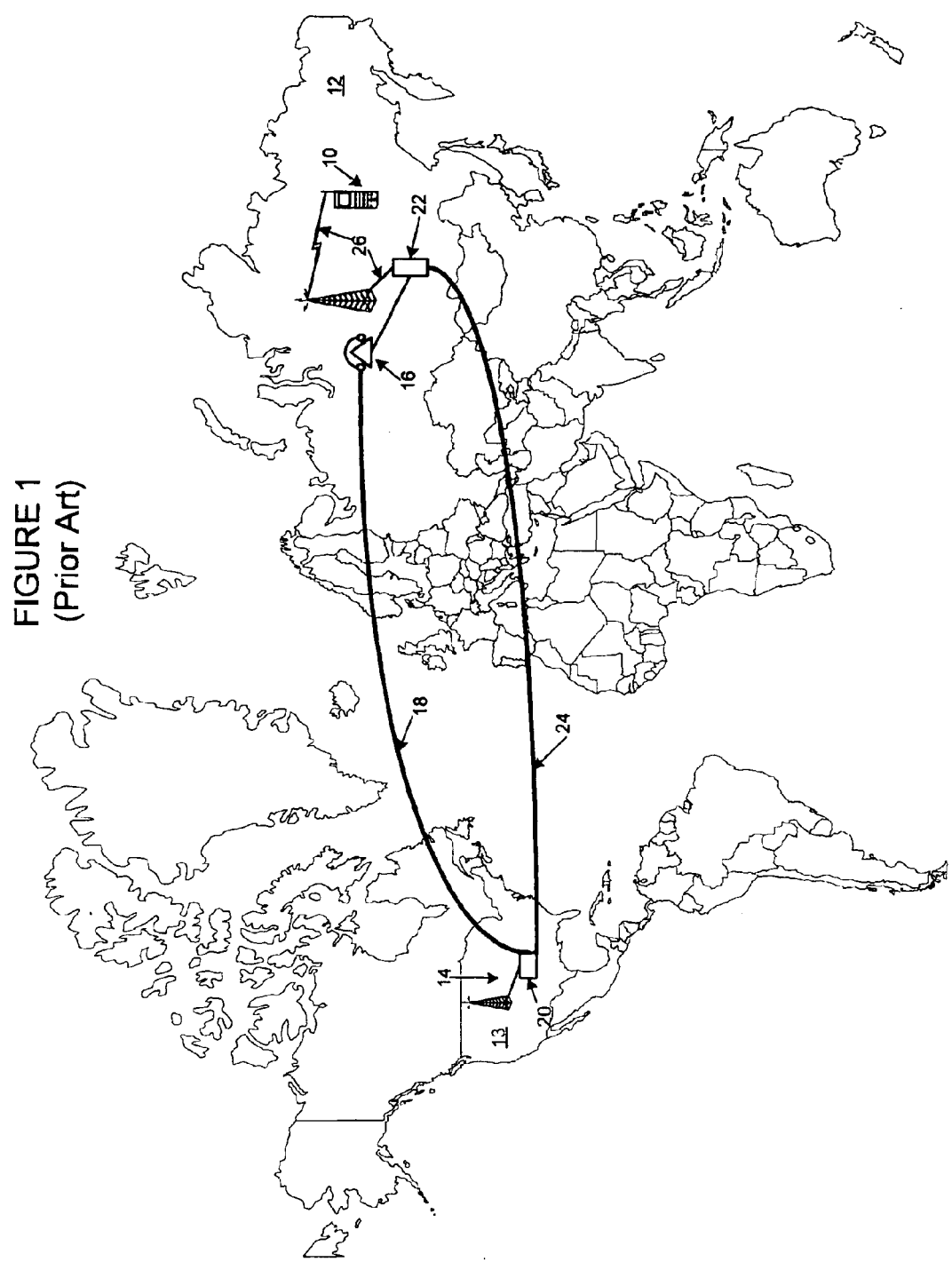
FIG. 1 is a block diagram depicting the general features of international roaming known in the arts.
Figure 2A:
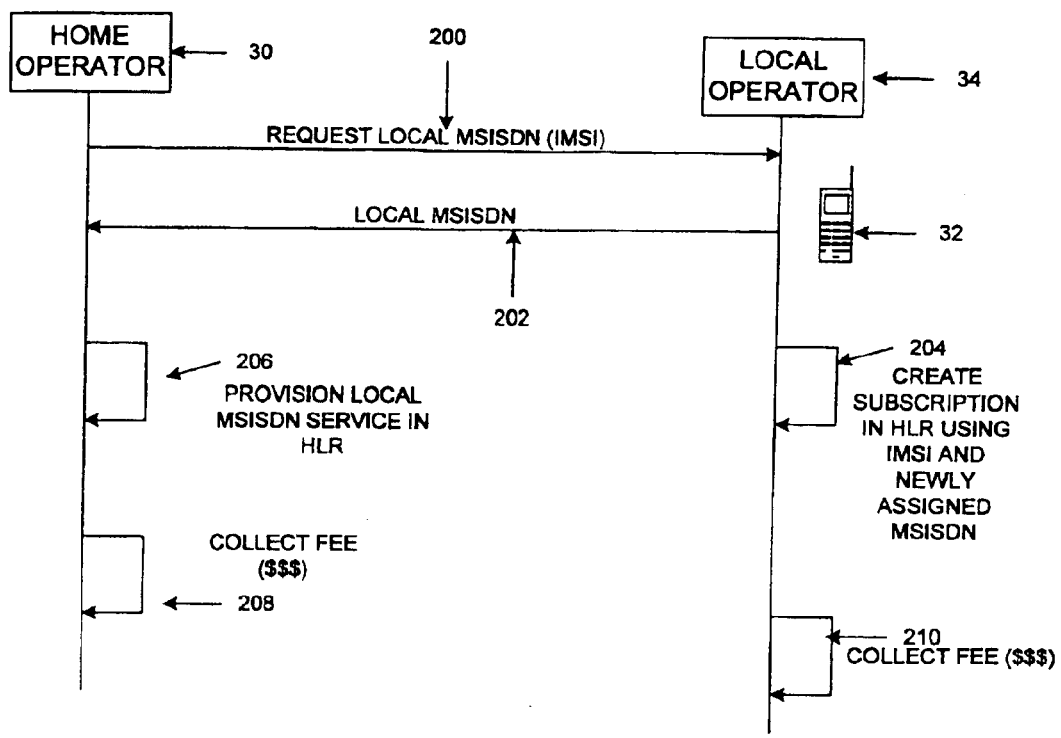
FIG. 2A is a message flow diagram showing an example of a handshake between two service providers using the invention prior to providing a non-local subscriber service in a local network.

With reference to FIG. 2A, an example of a handshake between two wireless network operators using the invention is shown. This must occur prior to the local operator providing service to the non-local subscriber. A home network operator 30 is illustrated requesting a Local MSISDN (LMSISDN) 200 for a particular subscriber 32, identified by a unique IMSI. A local operator 34 provides a LMSISDN 202 uniquely identifying the subscriber 32. Preferably, the provision of a LMSISDN is performed according to prearrangements between network operators including billing arrangements and specification of service parameters. The local operator 34 creates a local subscription 204 for the subscriber 32 using the LMSISDN and the subscriber 32 IMSI and any additional service parameters provided by the home operator 30. At a minimum, the local subscription, in addition to providing a LMSISDN, includes one or more purge conditions for triggering the termination of the local subscription for the non-local subscriber 32. Examples of purge conditions include a selected expiration time and date, or usage of a selected number of air time minutes. The home operator 30 provisions a new Local MSISDN service in the home HLR 40, step 206. The service parameters typically include the LMSISDN and purge conditions. Typically, the network operators 30 and 34 maintain billing systems 208, 210 related to providing services using the invention.

Figure 2B:
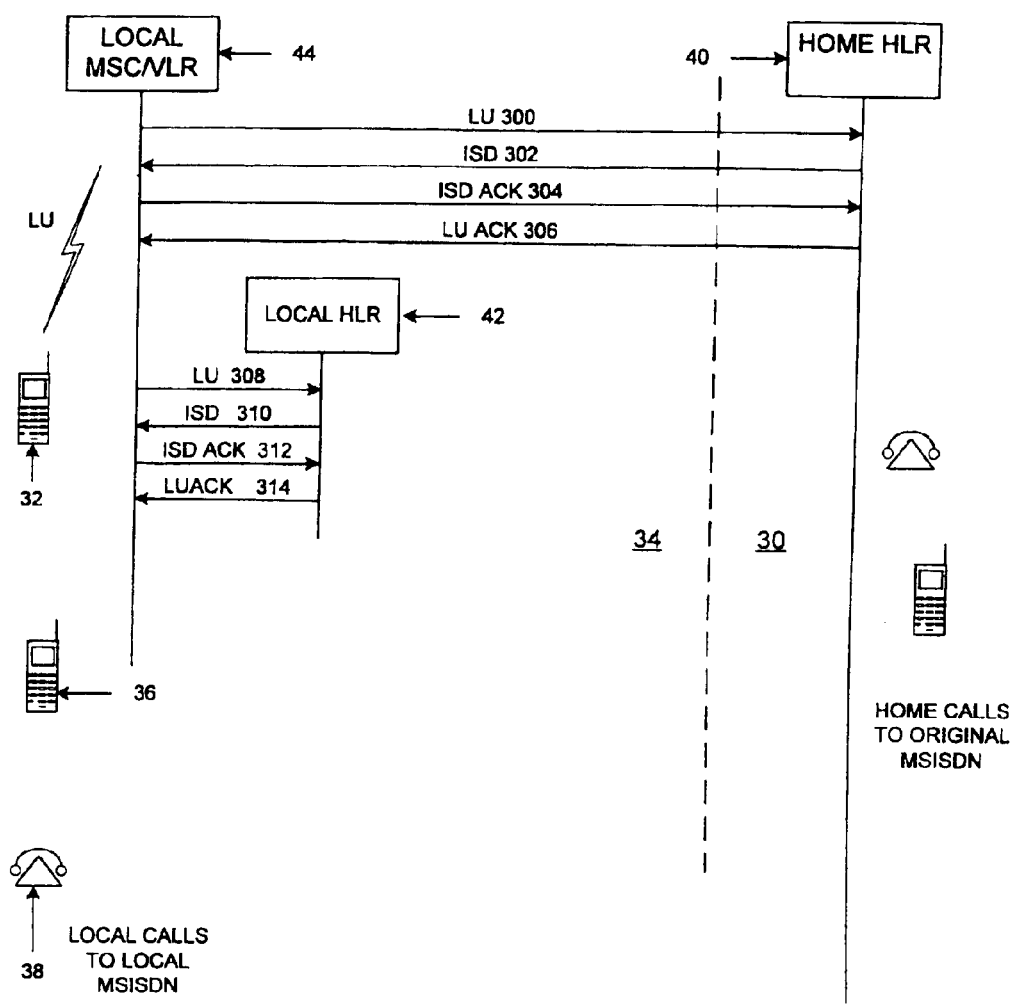
FIG. 2B is a message flow diagram showing an example of a location update sequence using the invention.

FIG. 2B depicts a non-local subscriber mobile station 32 performing a location update in a local PLMN 34 according to the invention. A location update message 300 passes from the local PLMN 34 to the home PLMN 30. The home PLMN 30 then provides subscriber data to the local PLMN 34 with an Insert Subscriber Data (ISD) message 302 providing information as to the services this subscriber 32 is entitled to receive. Preferably, the ISD message 302 includes the information that this subscriber 32 is entitled to receive Local MSISDN service in the local PLMN 34 as well as specific local services, e.g., call forwarding, messaging and the like. Typically, details regarding the parameters and charges for such services are prearranged among PLMN operators. In GSM, the parameter information is preferably transmitted via the extension container of the ISD message 302. In response, the local PLMN 34 sends an ISD acknowledgment message 304 to the home PLMN 30.

The home PLMN 30 sends a location update acknowledgment message 306 to the local PLMN 34. When the local PLMN 34 component serving the non-local subscriber 32, typically an MSC/VLR 44 (Mobile Switching Center and Visitor Location Register) is notified that the subscriber 32 has a subscription for LMSISDN service, the serving MSC/VLR 44 sends a second location update message 308 to its local HLR 42. The second location update message 308 is sent to the local HLR 42 by the serving MSC/VLR 44 using the LMSISDN as global title to address the local HLR 42. The local HLR 42 sends an Insert Subscriber Data (ISD) message 310 to the serving MSC/VLR 44. The local MSC/VLR 44 sends an ISD acknowledgment message 312 to the local HLR 42, and the local HLR 42 responds with a location update acknowledgment 314. Local callers, which may include mobile stations 36 and fixed local stations 38, as depicted in FIG. 2B may use the LMSISDN in communications with the non-local subscriber 32. Calls to the home MSISDN of the roaming subscriber 32 continue to be routed through the home PLMN 30.

Figure 3:
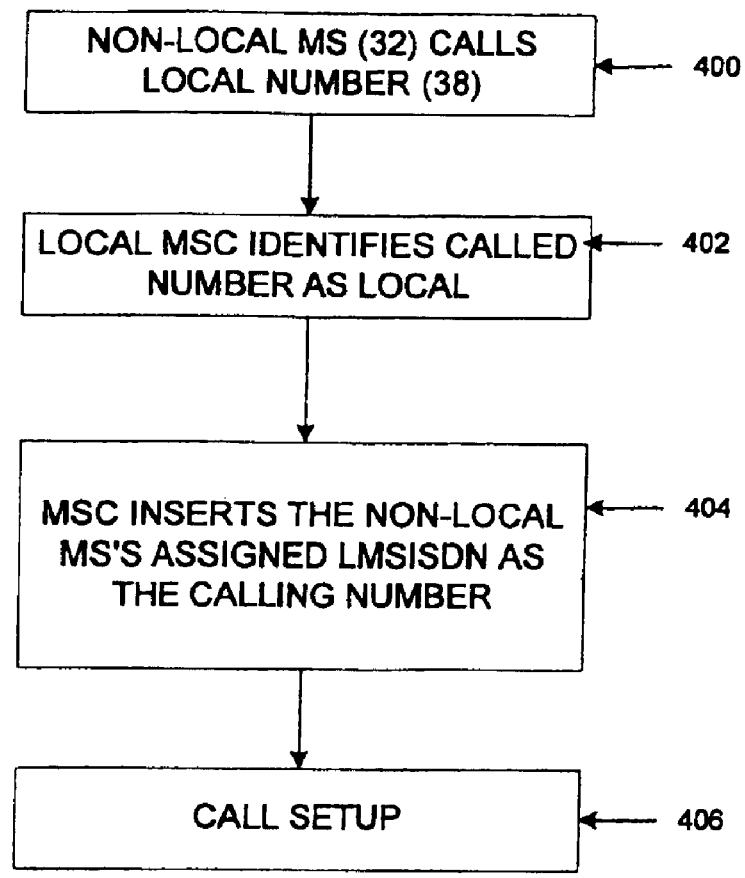
FIG. 3 is a flow diagram illustrating an example of the invention used by the non-local subscriber to originate a call to a local number.

FIG. 3 is a process flow diagram showing an example of a non-local subscriber 32 originating a call to a local number 38 (FIG. 2B) using the invention. The non-local subscriber 32 originates a call to a local number 38, step 400. The local serving MSC/VLR 44 identifies the call as local in step 402. The local MSC/VLR 44 serving the non-local subscriber 32 inserts the LMSISDN as the calling number, step 404, in place of using the non-local MSISDN otherwise associated with the non-local subscriber 32. The call setup then proceeds 406 as for any other locally originated call to a local number.

Figure 4:
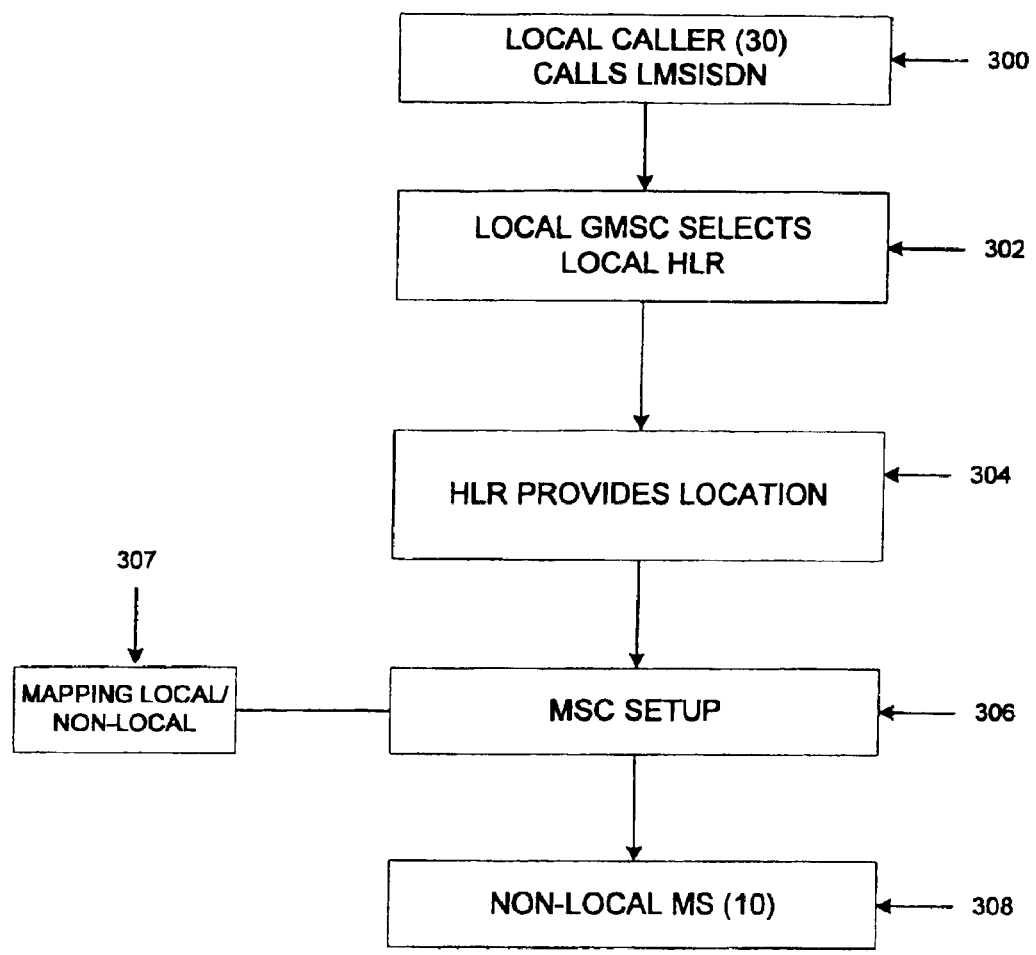
FIG. 4 is a flow diagram illustrating an example of the invention used to provide a terminating local call to a non-local subscriber.

FIG. 4 is a process flow diagram illustrating an example of the invention used to provide a terminating local call to the non-local subscriber 32 according to the example described with respect to FIG. 2. A local caller 38 calls the unique visitor identifier, or temporarily assigned local MSISDN in this example, at step 300. A local gateway MSC (GMSC), at step 302, uses the local MSISDN to determine which HLR of the local PLMN 22 to interrogate regarding the whereabouts of the non-local subscriber 32. At step 304, the call is directed to the appropriate serving MSC by the HLR. The serving MSC, in step 306, then inserts the LMSISDN and facilitates the connection with the non-local subscriber 32 according to local network procedures, step 308. Preferably, the Local MSISDN includes means by which the LMSISDN is mapped to the IMSI of the non-local subscriber 10 in such a way that the local MSCs are provided with a the capability to identify circumstances in which services provided to a non-local subscriber are in fact local services.

In addition to calling services, the non-local subscriber 32 is preferably provided with other local services offered by the local PLMN operator 34 to its own subscribers. Additional services may also be provided to the non-local subscriber 32 by the local PLMN operator 34.

It should be understood that the non-local subscriber 32 continues to receive terminating calls from its home PLMN 30 according to ordinary roaming call setup procedures. Similarly, calls originating from the non-local subscriber 32 to numbers in the home PLMN 30 are routed according to the ordinary procedures for roaming calls. It will be appreciated by those skilled in the arts that the specifics of the communications among PLMNs using the invention are not crucial to the invention, and are thus not shown or described in detail. Although the examples herein are described in terms of GSM, the invention may be adapted to operate with other implementations of wireless telecommunications PLMNs.

Figure 5:
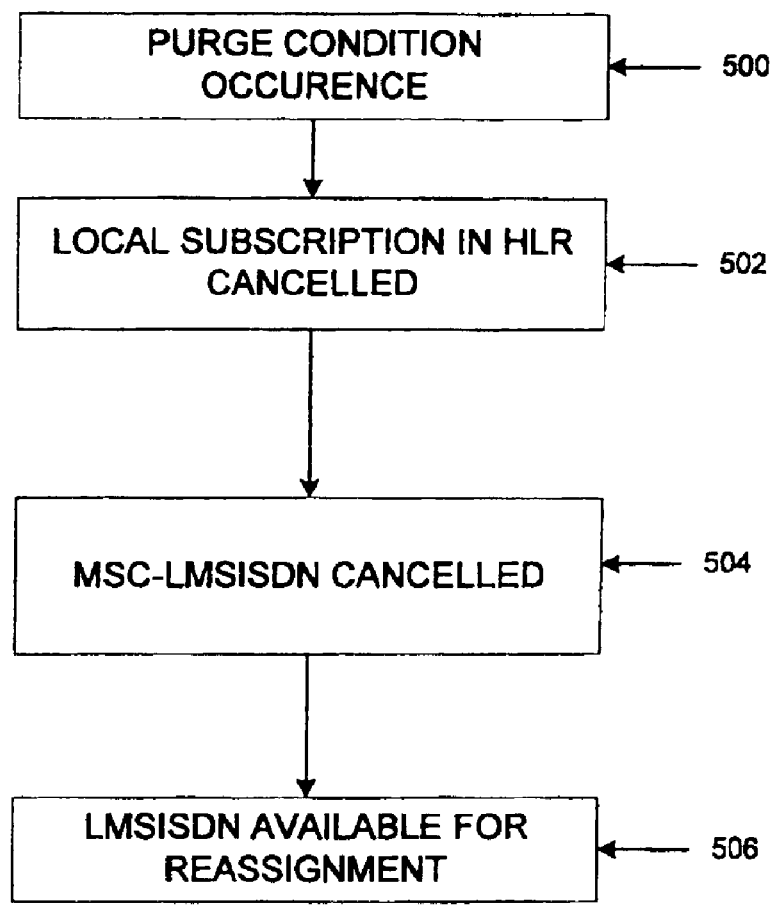
FIG. 5 is a flow diagram illustrating an example of disassociating a non-local subscriber from a LMSISDN.

FIG. 5 is a process flow diagram illustrating an example of dissociation techniques for purging an LMSISDN in a local PLMN. As discussed above, upon initiation of a local subscriber number and local service for a non-local wireless subscriber, one or more purge conditions for the temporary subscription are established. For example, the expiration of a particular time and date, or the usage of a predetermined number of air-time minutes. Other purge conditions may be used such as a period of non-use of local services, or exhaustion of prepayment for services. Upon the occurrence of a purge condition 500, the local PLMN preferably purges the local subscription in its HLR, step 502. Shown in step 504, the MSC's and VLR's of the local PLMN no longer permit the use of the LMSISDN previously assigned to the non-local subscriber to originate or terminate service. Typically, the LMSISDN is returned to a pool in the PLMN for eventual reassignment, 506.

Figure 6:
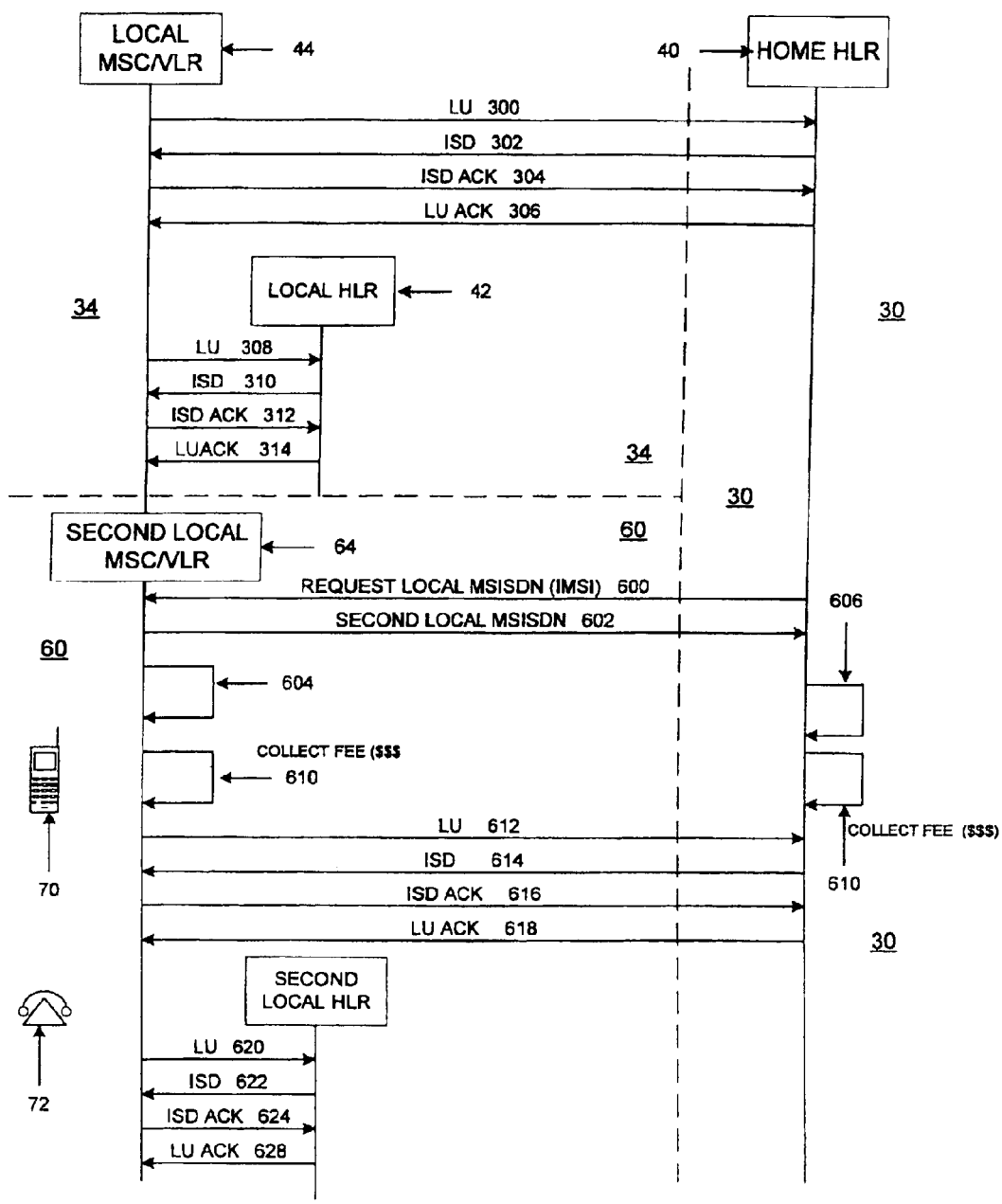
FIG. 6 is a message flow diagram illustrating an example of the invention wherein a non-local subscriber moves from a first local operator service area to a second local operator service area.

FIG. 6 is a diagram illustrating an example of a non-local subscriber 32 registered for local service with a first local PLMN operator 34 according to the invention as shown and described with reference to FIG. 2A, in the event the subscriber 32 moves from a first local service area 34 (FIG. 2A) to a second local service area having a second PLMN operator 60. In this example, a non-local subscriber 32, has been provided local services according to the invention as in the example of FIGS. 2A–B, in a non-local PLMN 34. The home PLMN 30 has prearranged non-local service with the second local PLMN 60. As in the previous example referring to FIG. 2A, a handshake between the two PLMNs 30, 60 using the invention includes a request for a Local MSISDN (LMSISDN) 600 for the particular subscriber 32, identified by a unique IMSI. The second local PLMN operator 60 provides a LMSISDN 602 uniquely identifying the subscriber 32. Preferably, the provision of a LMSISDN is performed according to prearrangements between network operators including billing arrangements and specification of service parameters. The second local PLMN operator 60 creates a local subscription 604 for the subscriber 32 using the LMSISDN and the subscriber 32 IMSI and any additional service parameters provided by the home operator 30. At a minimum, the local subscription, in addition to providing a LMSISDN, includes one or more purge conditions for triggering the termination of the local subscription for the non-local subscriber 32. Examples of purge conditions include a selected expiration time and date, or usage of a selected number of air time minutes. The home operator 30 provisions new LMSISDN service in the home HLR 40, step 606. Service parameters typically include at least the LMSISDN and purge conditions. Typically, the network operators 30 and 60 maintain billing systems 608, 610 related to providing services using the invention.

Further referring to FIG. 6, the non-local subscriber mobile station 32 performing a location update in the second local PLMN 60 causes a location update message 612 to pass from the second local PLMN 60 to the home PLMN 30. The home PLMN 30 provides subscriber data to the second local PLMN 60 with an Insert Subscriber Data (ISD) message 614 providing information as to the services this subscriber 32 is entitled to receive. Preferably, the ISD message 614 includes the information that this subscriber 32 is entitled to receive local service in the second local PLMN 60 as well as specific local services, e.g., call forwarding, messaging and the like. Preferably, details regarding the parameters and charges for such services are prearranged among PLMN operators. In GSM, the parameter information is preferably transmitted via the extension container of the ISD 614. In response, the second local PLMN 60 preferably sends an ISD acknowledgment message 616 to the home PLMN 30. The home PLMN 30 sends a location update acknowledgment message 618 to the second local PLMN 60.

The second local PLMN 60 is adapted to use the LMSISDN as a global title for the non-local subscriber 32. The second local PLMN 60 sends its second location update message 620 to its local HLR 66. The second location update message 620 includes the LMSISDN assigned to the non-local subscriber 32 by the second local PLMN 60. The local HLR 66 sends an Insert Subscriber Data (ISD) message 622 to the second local PLMN 60 component serving the non-local subscriber 32, typically an MSC/VLR 64. The local second PLMN 60 sends an ISD acknowledgment message 624 to the local HLR 66, and the local HLR 66 responds with a location update acknowledgment 628. Terminals local to the second PLMN 60, which may include mobile stations 70 and fixed network stations 72, use the LMSISDN in communications with the non-local subscriber 32. Calls to the home MSISDN of the roaming subscriber 32 continue to be routed through the home PLMN 30.

Thus, a non-local subscriber 32 is able to roam from PLMN-to-PLMN and/or country-to-country, while being provided a unique local identifier, or LMSISDN, for receiving local calls, while still retaining home-PLMN accessability. The embodiments shown and described above are only exemplary. Even though numerous characteristics and advantages of the present invention have been set forth in the foregoing description together with details of the invention, the disclosure is illustrative only and changes may be made within the principles of the invention to the full extent indicated by the broad general meaning of the terms used in the attached claims.

I claim:

1. A method of providing local wireless telecommunication service to a non-local subscriber comprising the steps of: a non-local operator requesting from a local operator a unique visitor identifier for use by the non-local subscriber the local operator associating a unique visitor identifier with the non-local subscriber, the non-local subscriber performing a location update with the local operator; the local operator providing local service to the non-local subscriber via the unique visitor identifier; dissociating the unique visitor identifier from the no-local subscriber on the basis of elapsed time.

2. The method of claim 1 wherein the step of assigning a unique visitor identifier further comprises assigning a Local MSISDN (LMSISDN).

3. The method of claim 1 further comprising the step of the local operator using the LMSISDN as a global title for the non-local subscriber.

4. The method of claim 1 further comprising the step of mapping the unique visitor identifier to the IMSI of the non-local subscriber.

5. The method of claim 1 further comprising the step of a local Home Location Register (HLR) associating the non-local subscriber IMSI with the unique visitor identifier.

6. The method of claim 1 further comprising the step of a local Mobile Switching Center (MSC) using the unique visitor identifier for a local call originating from the non-local subscriber.

7. The method of claim 1 further comprising the step of a local Gateway MSC using the unique visitor identifier for a local call terminating with the non-local subscriber.

8. The method of claim 1 further comprising the step of a local MSC using the non-unique visitor identifier for a non-local call originating from the non-local subscriber.

9. The method of claim 1 further comprising the step of a local GMSC using the non-local MSISDN for a non-local call terminating with the non-local subscriber.

10. The method of claim 1 further comprising the step of dissociating the unique visitor identifier from the non-local subscriber on the basis of air-time minute count.

11. The method of claim 1 further comprising the step of providing local services to the non-local subscriber mirroring the non-local subscriber's home services.

12. A system of providing local wireless telecommunication service to a non-local subscriber comprising: a non-local network-having a non-local home location register, a local network having a local home location register; means for providing a non-local subscriber with a unique visitor identifier in the local home location roister; and a local mobile switching center having means for distinguishing between a non-local subscriber entitled to loca services and other non-local subscriber such that an authorized non-local subscriber is provided local wireless services via a unique visitor identifier and means for dissociating the unique visitor identifier from the no-local subscriber on the basis of elapsed time.

13. The system of claim 12 wherein the local and non-local networks comprise GSM networks.

14. The system of claim 12 further comprising means for mapping the unique visitor identifier to the IMSI of the non-local subscriber.

15. The system of claim 12 further comprising means for dissociating the unique visitor identifier from the non-local subscriber on the basis of air-time minute count.

* * * * *